(12) United States Patent
Yamazaki et al.

(10) Patent No.: US 7,940,612 B2
(45) Date of Patent: May 10, 2011

(54) OPTICAL DISC APPARATUS AND CONTROL METHOD THEREOF

(75) Inventors: Shigeki Yamazaki, Matsudo (JP); Tomomi Okamoto, Yokohama (JP); Kazuki Nakazawa, Tokyo (JP)

(73) Assignees: Hitachi, Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 190 days.

(21) Appl. No.: 12/430,967

(22) Filed: Apr. 28, 2009

(65) Prior Publication Data
US 2009/0316540 A1     Dec. 24, 2009

(30) Foreign Application Priority Data

Jun. 19, 2008   (JP) .................................. 2008-160345

(51) Int. Cl.
*G11B 7/00*   (2006.01)
(52) U.S. Cl. ................. 369/44.32; 369/44.23; 369/44.25
(58) Field of Classification Search ............... 369/44.32, 369/44.25, 44.23
See application file for complete search history.

(56) References Cited

U.S. PATENT DOCUMENTS
2007/0189131 A1 *   8/2007   Kuze et al. ................. 369/44.23

FOREIGN PATENT DOCUMENTS
JP          2006-185498         7/2006

* cited by examiner

*Primary Examiner* — Adam R Giesy
(74) *Attorney, Agent, or Firm* — Antonelli, Terry, Stout & Kraus, LLP.

(57) ABSTRACT

The present invention provides an optical disc apparatus that reduces access time while suppressing the emanation of heat from a beam expander. A microcomputer manages the operation time and pause time of a stepping motor constructed to move the movable lens of the beam expander, and in accordance with the duration of an immediately previous pause, limits the number of successive stepping-motor driving actions following the pause time, below a maximum permissible count. When the pause duration is shorter than a threshold value or when the number of successive stepping-motor driving actions reaches the maximum permissible count, the microcomputer starts next driving of the stepping motor after a required waiting time.

6 Claims, 5 Drawing Sheets

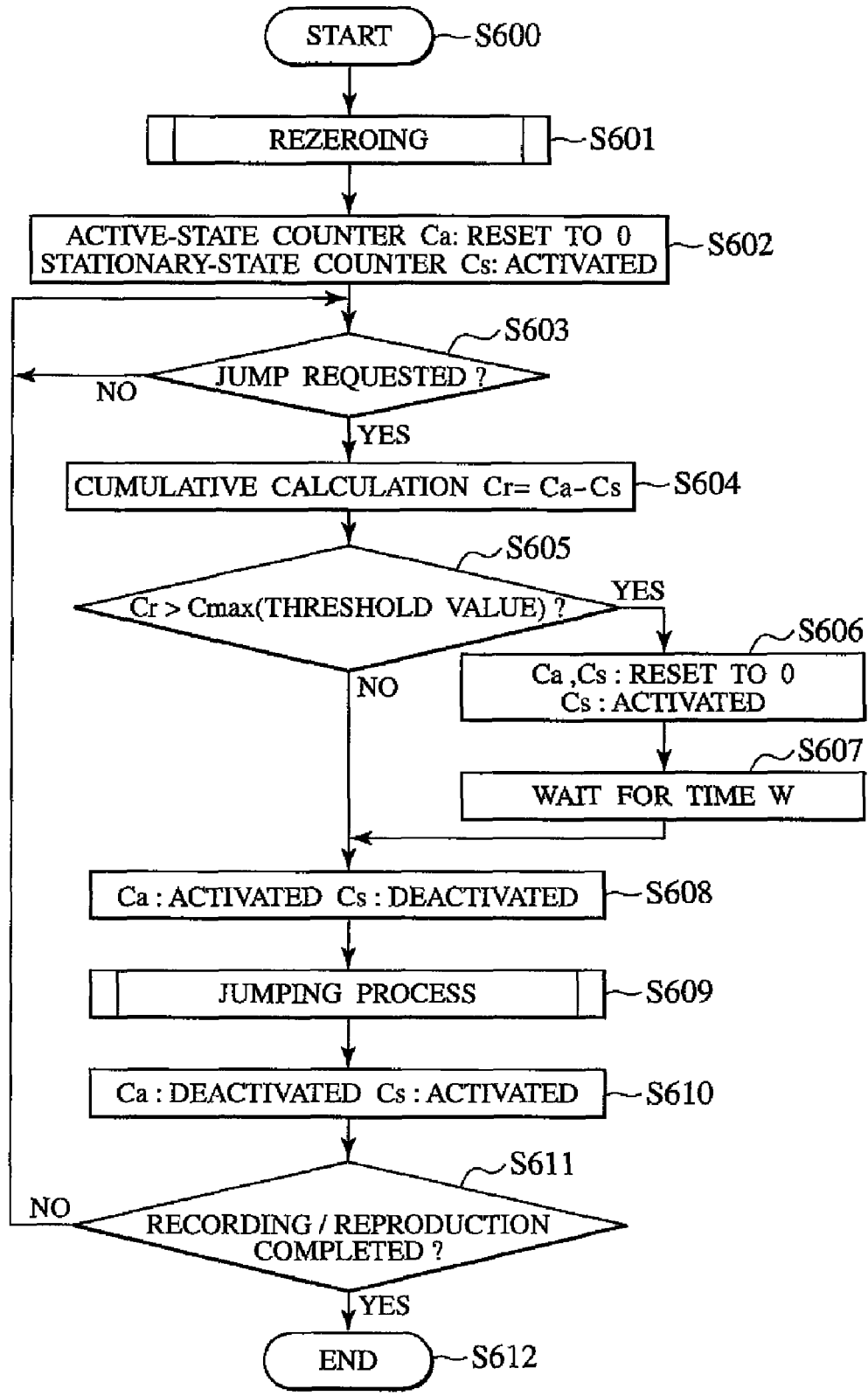

OPTICAL DISC APPARATUS AND CONTROL METHOD THEREOF

CLAIM OF PRIORITY

The present application claims priority from Japanese patent application serial No. JP 2008-160345, filed on Jun. 19, 2008, the content of which is hereby incorporated by reference into this application.

BACKGROUND OF THE INVENTION

1. Field of the Invention

The present invention relates generally to optical disc apparatuses for recording information on or reproducing recorded information from an optical disc. More particularly, the invention concerns a method for controlling a beam expander within an optical pickup.

2. Description of the Related Art

In Blu-ray discs (BDs) with a high-density recording capacity, since a first recording layer and a second recording layer are disposed at desired intervals in the perpendicular direction of the disc, spherical aberration occurs when control is switched from one of the recording layers to the other. In order to correct the spherical aberration, optical disc apparatuses contain a motor-driven correcting lens assembly called a beam expander, in respective optical pickups. The beam expander comprising a fixed lens and a movable lens corrects the spherical aberration by moving the movable lens while controlling the position thereof with a stepping motor. The stepping motor, when driven, will naturally give off heat and thus increase the ambient temperature of the motor. The ambient temperature, in particular, needs to be limited below its maximum permissible level to minimize effects upon the operational performance of the optical pickup.

To suppress the emanation of heat from the stepping motor during the activation of the beam expander, it is effective to reduce the driving current or driving time of the motor. A technique for controlling aberrational correction according to ambient temperature in order to stabilize the operation of a beam expander against temperature changes is proposed as an alternative method (refer to JP-A-2006-185498).

SUMMARY OF THE INVENTION

While it is effective to reduce the driving current or driving time of the motor for suppressed heat emanation from the stepping motor, these operations correspondingly deteriorate driving torque or access performance. For example, there is a method in which the motor, once driven, will be made to wait for a required time with each request until the motor has been next driven. Dual-layer BD media requires a repeated interlayer focus jump. Providing a waiting time for each jump, however, causes a significant delay in access and deteriorates the performance of the disc apparatus. For these reasons, it has been traditionally difficult to reduce access time for suppressed motor heat. Reduction in access time is not described in above JP-A-2006-185498.

An object of the present invention is to provide an optical disc apparatus that suppresses heat emanation from a beam expander while at the same time shortening an access time, and a method for controlling the apparatus.

An optical disc apparatus according to the present invention includes a stepping motor which moves a movable lens of a beam expander in a direction of an optical axis, a beam expander driving circuit which drives the stepping motor, and a microcomputer which controls the beam expander driving circuit. The microcomputer manages an operation time and pause time of the stepping motor such that in accordance with a duration of an immediately preceding pause, the number of successive stepping-motor driving actions following the pause time is limited below a maximum permissible count. When the pause duration is shorter than a threshold value thereof or when the maximum permissible number of successive stepping-motor driving actions is reached, the microcomputer starts next driving of the stepping motor after a required waiting time.

Another optical disc apparatus according to the present invention includes a stepping motor which moves a movable lens of a beam expander in a direction of an optical axis, a beam expander driving circuit which drives the stepping motor, and a microcomputer which controls the beam expander driving circuit. The microcomputer calculates a cumulative operation time of the stepping motor from an operation time and pause time thereof, then when the cumulative operation time exceeds a threshold value, sets a required waiting time, and starts next driving of the stepping motor after the waiting time.

A method of controlling an optical disc apparatus according to the present invention includes the steps of: moving a movable lens of a beam expander in a direction of an optical axis by driving a stepping motor; measuring a cumulative operation time of the stepping motor from an operation time and pause time thereof; and in accordance with a duration of an immediately preceding pause, limiting the number of successive stepping-motor driving actions following the pause duration, below a maximum permissible count.

Another method of controlling an optical disc apparatus according to the present invention includes the steps of: moving a movable lens of a beam expander in a direction of an optical axis by driving a stepping motor; measuring a cumulative operation time of the stepping motor from an operation time and pause time thereof; and when the cumulative operation time exceeds a threshold value, setting a required waiting time and starting next driving of the stepping motor.

According to the present invention, access time can be reduced while at the same time suppressing heat emanation from the beam expander, so the disc apparatus improves in performance and in the apparatus user's operational convenience.

BRIEF DESCRIPTION OF THE DRAWINGS

These and other features, objects and advantages of the present invention will become more apparent from the following description when taken in conjunction with the accompanying drawings wherein:

FIG. 6 is a flowchart representing the beam expander control method shown in FIG. 5.

DETAILED DESCRIPTION OF THE EMBODIMENT

Hereunder, embodiments of the present invention will be described in accordance with the accompanying drawings.

First Embodiment

Figure 1:
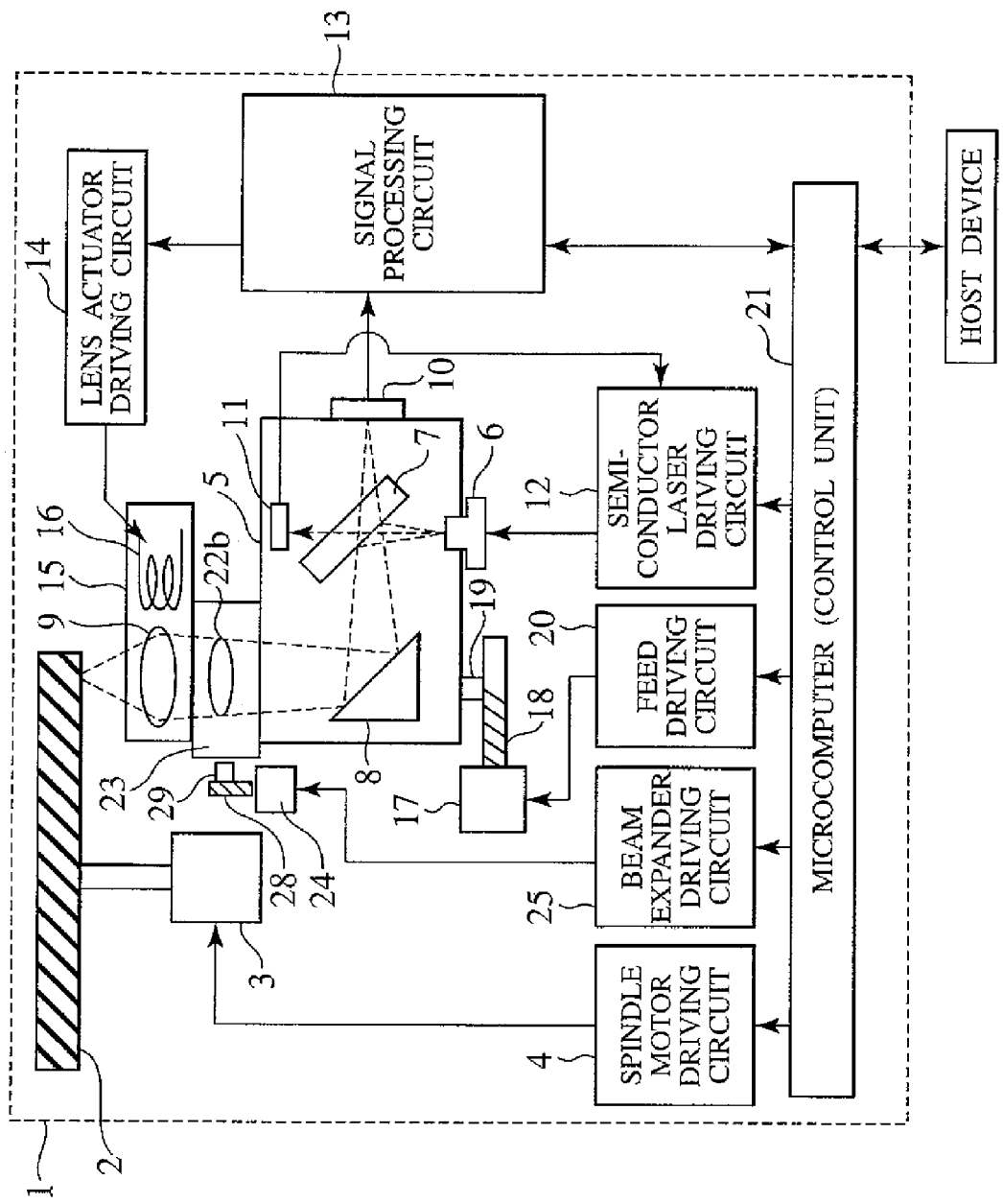
FIG. 1 is a block diagram of an optical disc apparatus according to a first embodiment of the present invention.

FIG. 1 is a block diagram of an optical disc apparatus according to the present invention, showing an embodiment of the disc apparatus. The optical disc apparatus 1 is shown in a frame of a dotted line in FIG. 1, and when data is accessed, an optical disc 2 is mounted in the disc apparatus 1. A spindle motor 3 rotates the optical disc 2 by means of electric power supplied from a spindle motor driving circuit 4 to drive the spindle motor 3. In an optical pickup 5, an outgoing laser beam from a semiconductor laser light source 6 is reflected from a half mirror 7 and a mirror 8 and then converged into a very small spot of light by an objective lens (focusing lens) 9 to irradiate the optical disc 2. In this process, a monitor detector 11 detects intensity of the outgoing laser beam, and a semiconductor laser driving circuit 12 controls the intensity of the outgoing laser beam to obtain fixed beam intensity.

The laser beam, after being reflected from the optical disc 2, is converged by the objective lens 9 once again, then reflected from the mirror 8, and passed through the half mirror 7 to reach a four-divided light detector 10. The half mirror 7 formed of a thick glass plate on which a reflecting film with a reflectance of about 50% is deposited is disposed at an inclination of about 45 degrees to an optical axis. Astigmatism is therefore assigned to the laser beam that reaches the four-divided light detector 10. The four-divided light detector 10 has its photo-detection region divided into four photodetection elements, and outputs a signal according to the optical intensity of the laser beam detected by each photodetection element.

A signal-processing circuit 13 receives the output signal from the four-divided light detector 10 and generates a focusing error (FE) signal, a 4D sum signal (PE signal), a tracking error (TE) signal, and an information reproduction signal. A lens actuator driving circuit 14 amplifies the FE signal and TE signal which are output from the signal-processing circuit 13, and supplies the signals to an internal coil 16 of a lens actuator 15. The coil 16 adjusts a position of the objective lens 9 to orient the lens 9 in a direction of the optical axis (i.e., a focusing direction) and a radial direction of the disc (i.e., a tracking direction).

A feed mechanism of the optical pickup 5 is constructed by mounting a helically grooved shaft 18 on the stepping motor 17 and then inserting a pin 19 fixed to the optical pickup 5, into the groove of the shaft 18. A microcomputer 21 and a feed driving circuit 20 operate together to rotate the shaft 18 mounted on the stepping motor 17, and move the entire optical pickup 5 in the radial direction of the disc.

Figure 2:
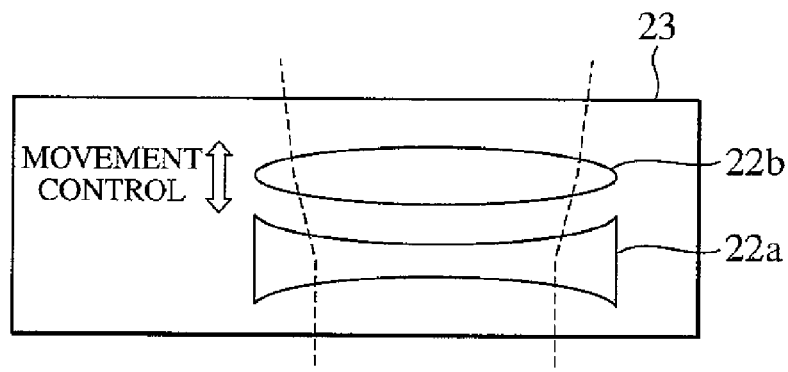
FIG. 2 is a diagram showing a beam expander lens arrangement.

In the disc apparatus of the present embodiment, the optical pickup 5 further includes a beam expander 23. FIG. 2 is a diagram showing a lens arrangement of the beam expander. Laser light with a wavelength of 405 nm, and the objective lens 9 with a numerical aperture of 0.85 are used for BD recording and reproduction. However, out-of-focus error tolerances for BDs are severe, compared with those of DVDs. Accordingly, the beam expander 23 with a fixed lens 22a and a movable lens 22b in combination is provided independently of the objective lens 9. The movable lens 22b is moved to adjust a position thereof to accurately narrow in the laser beam onto a recording surface of the BD medium, whereby corrections for spherical aberration are conducted.

Figure 3:
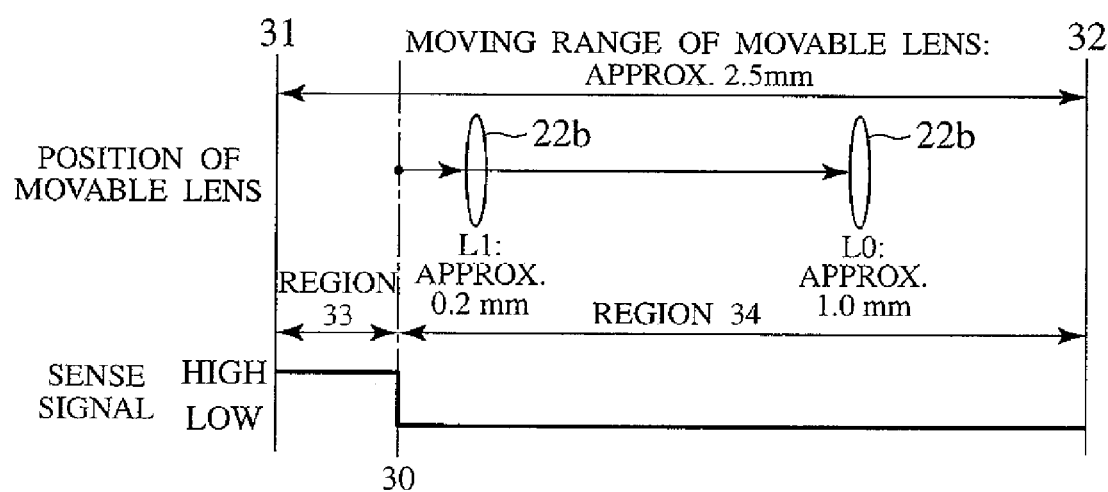
FIG. 3 is a diagram that illustrates movements of a movable lens of the beam expander.

FIG. 3 is a diagram illustrating the movement of the movable lens 22b of the beam expander 23. When the optical disc is a BD, a moving range of the movable lens 22 is about 2.5 mm, with moving stroke limits (walls) 31 and 32 being provided at both ends of the moving range. The moving range also includes a rezero point 30 as a reference position. The rezero point is defined as a change point of polarity (High/Low levels) of a sense signal of a position sensor (e.g., photointerrupter) not shown. This is because the position of the movable lens 22b in the beam expander cannot be detected during an activation phase of the disc apparatus. The movable lens 22b is therefore positioned by searching for the rezero point 30 by means of the sense signal first (the search is called rezeroing) and then moving the movable lens 22b through a required distance to a desired position.

In FIG. 3, the polarity of the sense signal is High in a region 33 from the moving stroke limit 31 to the rezero point 30, and Low in a region 34 from the moving stroke limit 32 to the rezero point 30. However, since hysteresis depending upon a moving direction of the movable lens 22b occurs with a change in the level of the sense signal, the rezero point is assigned to, for example, a position at which the signal level changes from High to Low. Positions of the movable lens with respect to recording layers L0 and L1 of the BD medium are present at distances of about 1.0 mm for the L0 layer and about 0.2 mm for the L1 layer, from the rezero point 30. After rezeroing, the movable lens is moved through the distance corresponding to the layer L0 or L1. In addition, a jumping operation for reciprocating the movable lens between the layers L0 and L1 is conducted during recording or reproduction.

A mechanism for moving the movable lens 22b of the beam expander 23 is constructed by mounting a helically grooved shaft 28 on a beam expander stepping motor 24 and then inserting a pin 29 fixed to the beam expander 23 (movable lens 22b), into the groove of the shaft 28. The microcomputer 21 controls the beam expander driving circuit 25 to drive the stepping motor 24. The motor 24 has a high resolution of, for example, 10 μm/step at a driving frequency of 1,000 pps (pulses per step), and a required distance of movement is achieved at this driving pulse rate.

In the optical disc apparatus of the present embodiment, the microcomputer 21 manages a driving time (operation time) and pause time of the beam expander 23 (stepping motor 24), and in accordance with a duration of the pause, limits the number of successive moving actions (jumping actions) of the movable lens 22b. More specifically, if an immediately preceding pause time is long enough, continuous movement of the movable lens is permitted, and if the pause time is too short, the number of successive moving actions is limited or the movable lens is controlled to perform next action after a required waiting time. Thus, heat emanation due to the driving of the stepping motor is suppressed and an access time within a permissible time of heat emanation is reduced.

Figure 4A:
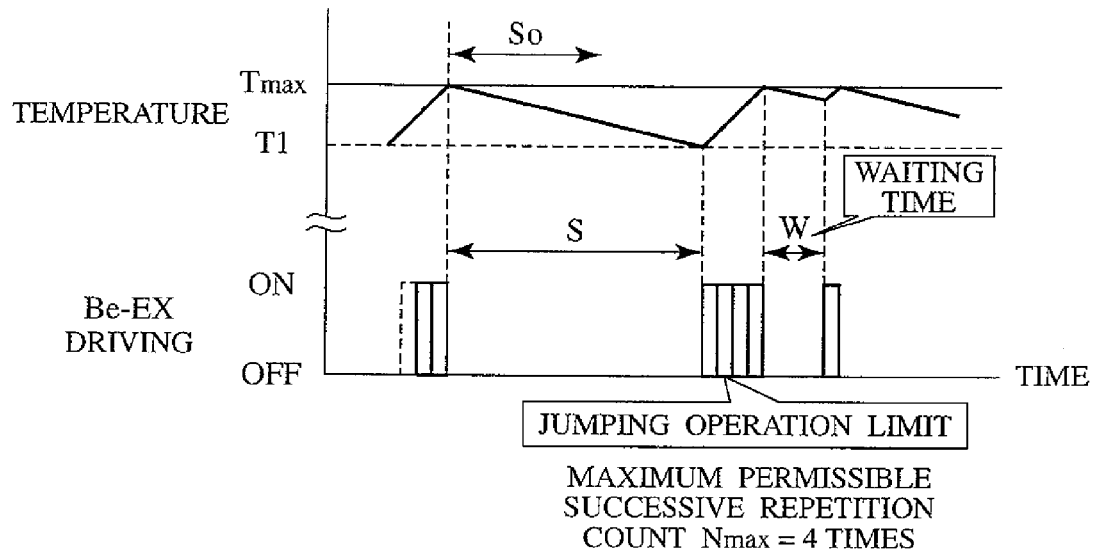
FIGS. 4A and 4B are diagrams illustrating a method of controlling the beam expander in the first embodiment.
Figure 4B:
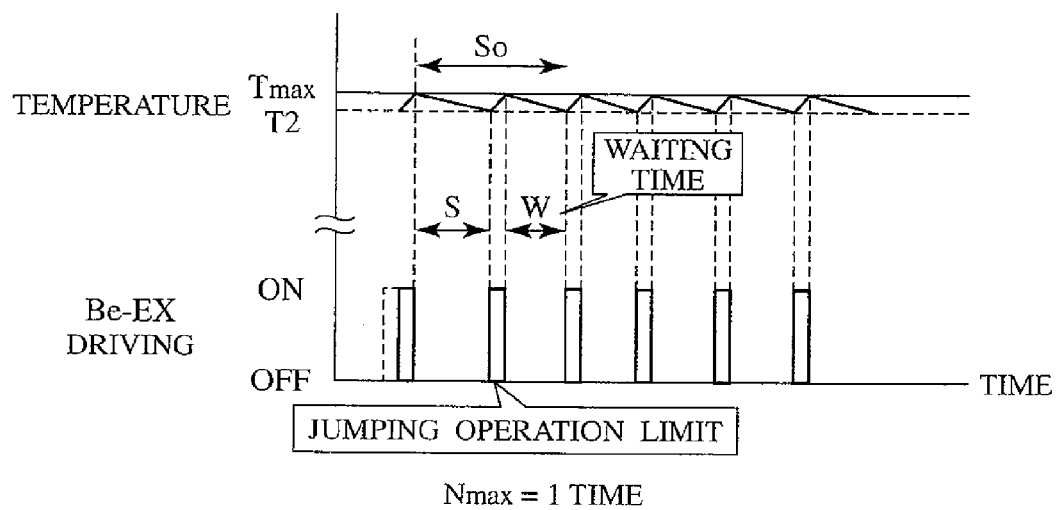

FIGS. 4A and 4B are diagrams that illustrate operational control of the beam expander in the present embodiment. In the figures, an active state of the beam expander (hereinafter, referred to as the Be-EX) is shown as ON, and an inactive (pause) state, as OFF. A duration of the ON state is substantially constant for each jump. The figures also show changes in ambient temperature due to Be-EX driving (i.e., the emanation of heat from the stepping motor), and Tmax denotes a maximum permissible temperature. In the present embodiment, when a driving request (jumping request) to the Be-EX is received, a duration S of the immediately preceding pause (OFF state) is compared with a threshold value So and the number of successive Be-EX driving actions following the pause duration is limited below a maximum permissible count Nmax.

FIG. 4A applies when the pause time S is long (S>So), and assumes a plurality of driving actions as the maximum permissible successive driving count Nmax. This Nmax value is determined by driving the Be-EX a plurality of times in succession in a temperature range from a stopping temperature T1 of the Be-EX to the maximum permissible temperature Tmax and measuring the number of executable successive Be-EX driving actions beforehand. For example, Nmax is set to be equal to 4, as shown in FIG. 4A. In this example, when the number of successive jumping requests is four or less, operation is repeated the requested number of times in succession, but when the number of successive jumping requests is five or more, operation is repeated four times in succession and then after the waiting time W, the fifth and subsequent actions are each conducted. The waiting time W is a time required for cooling to a temperature at which the operation can be restarted after the maximum permissible temperature Tmax has been reached. The waiting time W is set to be several hundreds of milliseconds (msec).

FIG. 4B applies when the pause time S is short (S<So), and assumes one driving action as the maximum permissible successive driving count Nmax. In this case, successive operation is prohibited because of an insignificant difference between an operational starting temperature T2 and the maximum permissible temperature Tmax. Therefore, even when the jumping request is for successive actions, each of the actions is separated into a single action in accordance with the Nmax value of 1 (action) and conducted after the waiting time W. In addition, when the pause duration S is shorter than the waiting time W (S<W), operation is conducted after the waiting time W has elapsed.

In the above description, one threshold value So has been set for the pause time S. However, a plurality of threshold values So can be set to subdivide the pause time S. In this case, more precise control will be possible since a plurality of maximum permissible successive driving counts Nmax will be set according to the particular pause duration S.

According to the present embodiment, access performance within a permissible temperature range can be further improved since the number of successive jumping actions is increased according to a particular margin of increases in temperature.

Second Embodiment

A method of limiting the moving actions (jumping actions) of the movable lens according to the particular cumulative operation time by managing the operation time and pause time of the beam expander is described below as another embodiment for suppressing the emanation of heat from the beam expander. In this control method, the cumulative operation time is compared with a previously set threshold value and when this threshold value is exceeded, the next action is conducted after a waiting time.

Figure 5:
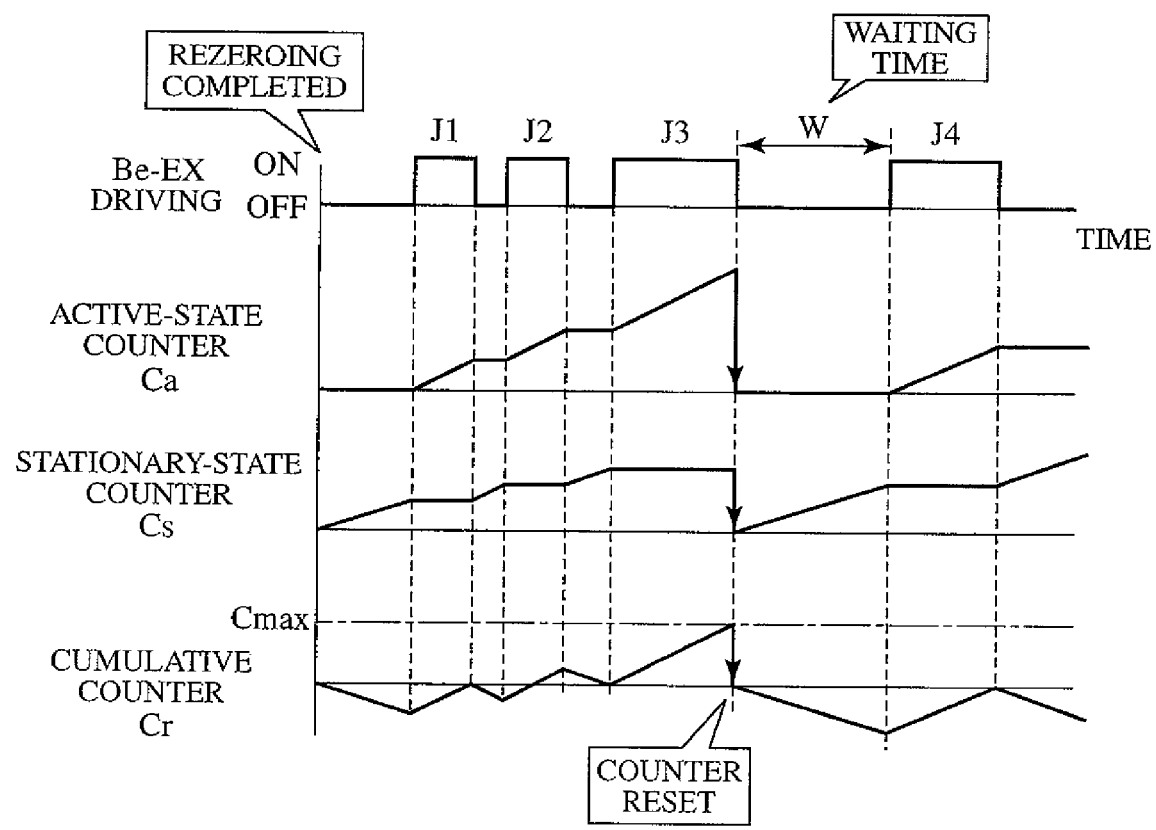
FIG. 5 is a diagram illustrating a method of controlling the beam expander in a second embodiment.

FIG. 5 is a diagram explaining the method of controlling the beam expander in the present embodiment. Operation periods of the beam expander (Be-EX) are shown as J1, J2, and so on, in the figure. In order to measure the cumulative operation time, the microcomputer 21 includes an active-state counter Ca, a stationary-state counter Cs, and a cumulative counter Cr. The active-state counter Ca counts a total operation time of the Be-EX (i.e., a total driving time of the stepping motor), and the stationary-state counter Cs counts a total stationary (pause) time. The cumulative counter Cr calculates a differential count value between the counters Ca and Cs, pursuant to expression (1), and uses the calculated value as the cumulative operation time. The differential count value between the counters Ca and Cs is calculated because the occurrence of heat under the active state and cooling under the stationary state require consideration.

$$Cr = ka \cdot Ca - ks \cdot Cs \quad (1)$$

where "ka" and "ks" are coefficients that incorporate a driving duty (successive operation rate), heating characteristics, and cooling characteristics of the Be-EX. Use of these coefficients allows more accurate control. For simplicity, the following description assumes "ka=ks=1."

As the cumulative operation time Cr increases, heat emanation from the motor increases the temperature of the Be-EX. Threshold value Cmax is the cumulative operation time up to the arrival of the Be-EX temperature at the maximum permissible temperature Tmax, and the threshold value is previously measured and determined. During Be-EX operation, when the value of the cumulative counter Cr exceeds the threshold value Cmax, the jumping action is stopped temporarily and then after the waiting time W, the next jumping action is started. In addition, the values of each counter are reset to zero prior to the waiting process. The motor heat can be suppressed by temporarily stopping the operation of the Be-EX. The waiting time W is a time required for cooling to the temperature at which the operation can be restarted after the maximum permissible temperature Tmax has been reached. The waiting time W is set to be several hundreds of milliseconds (msec).

In the figure, counter measurements are started after rezeroing, and during the jumping duration J3, the value of the cumulative counter Cr exceeds the threshold value Cmax. Accordingly, the next jumping action with the operation duration J4 is started after the elapse of the waiting time W.

FIG. 6 is a flowchart representing the beam expander control method shown in FIG. 5. The following successive processes progress under commands from the microcomputer 21:

Upon completion of optical disc mounting and receipt of an activation starting command (step S600), rezeroing for sensing a reference position is conducted as an initialize process for the beam expander Be-EX (step S601). This process is an operation that moves the movable lens 22b and positions the lens 22b accurately at the rezero point 30 at which the polarity (High/Low level) of the sense signal reverses as shown in FIG. 3. After rezeroing, the active-state counter Ca is cleared to zero (0) and up-counter operation of the stationary-state counter Cs is started (step S602). After this, the Be-EX waits for a jump command (sep S603). The jumping operation of the Be-EX is conducted to move the movable lens from the rezero point 30 to the position L0 or L1 and then further move the lens between L0 and L1.

Upon acceptance of the jumping request (i.e., Yes in step S603), a current cumulative operation time is calculated in accordance with expression (1) and the calculated value is assigned to the cumulative counter Cr (step S604). Next, a calculated value of the cumulative counter Cr is compared with the threshold value Cmax (step S605). When the value of the cumulative counter Cr is equal to or less than the threshold value Cmax (i.e., No in step S605), control directly proceeds to jumping process step S608 onward. When the value of the cumulative counter Cr is in excess of the threshold value Cmax (i.e., Yes in step S605), the active-state counter Ca and the stationary-state counter Cs are reset to 0 and after this, the up-counter operation of the stationary-state counter Cs is started (step S606). Next after the required waiting time W (step S607), control proceeds to jumping process step S608 onward.

During the jumping process, up-counter operation of the active-state counter Ca is started first and then that of the stationary-state counter Cs is stopped (step S608). Next, the stepping motor is driven for the Be-EX to conduct the requested jump (step S609). Upon completion of this jump, the up-counter operation of the active-state counter Ca is stopped and that of the stationary-state counter Cs is started (step S610). After completion judgment on the recording/reproducing operation (step S611), when the operation is not completed, control is returned to step S603, in which step, next jumping request is awaited. At this time, the active-state counter Ca retains a current count value and the stationary-state counter Cs proceeds to next process while continuing the up-counter operation.

According to the present embodiment, since the next jump is limited by management of the cumulative jumping operation time, even if the time of each jumping action is not constant, the amount of heat can be estimated very accurately and stable temperature control implemented.

While the above first and second embodiments suppress heat by managing the operation time and pause time of the beam expander, the disc apparatus can further include a temperature sensor and use this sensor in conjunction with the above elements. For example, more accurate control can be achieved by varying the settings of the pause time threshold value So, waiting time W, and cumulative counter threshold value Cmax in any one of the above embodiments, according to measured temperature.

In this way, according to the above embodiments, the performance of the optical disc apparatus and the user's operational convenience improve since access time can be reduced while suppressing the emanation of heat from the beam expander.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. An optical disc apparatus with a beam expander for correcting any spherical aberration of a laser beam emitted to an optical disc, the disc apparatus comprising:
   a stepping motor which moves a movable lens of the beam expander in a direction of an optical axis;
   a beam expander driving circuit which drives the stepping motor; and
   a microcomputer which controls the beam expander driving circuit;
   wherein the microcomputer manages an operation time and pause time of the stepping motor such that in accordance with a duration of an immediately preceding pause, the number of successive stepping-motor driving actions following the pause time is limited below a maximum permissible count.

2. The optical disc apparatus according to claim 1,
   wherein when the pause duration is shorter than a threshold value thereof or when the number of successive stepping-motor driving actions reaches the maximum permissible count, the microcomputer starts next driving of the stepping motor after a required waiting time.

3. An optical disc apparatus with a beam expander for correcting any spherical aberration of a laser beam emitted to an optical disc, the disc apparatus comprising:
   a stepping motor which moves a movable lens of the beam expander in a direction of an optical axis;
   a beam expander driving circuit which drives the stepping motor; and
   a microcomputer which controls the beam expander driving circuit;
   wherein the microcomputer calculates a cumulative operation time of the stepping motor from an operation time and pause time thereof, then when the cumulative operation time exceeds a threshold value, sets a required waiting time, and starts next driving of the stepping motor after the waiting time.

4. The optical disc apparatus according to claim 3,
   wherein the microcomputer calculates the cumulative operation time of the stepping motor by adding the operation time thereof and subtracting the pause time thereof, and when the cumulative operation time exceeds the threshold value, sets the required waiting time and resets the cumulative operation time value after the waiting time.

5. A method of controlling an optical disc apparatus which uses a beam expander to correct any spherical aberration of a laser beam emitted to an optical disc, the method comprising the steps of:
   moving a movable lens of the beam expander in a direction of an optical axis by driving a stepping motor;
   measuring an operation time and pause time of the stepping motor; and
   in accordance with a duration of an immediately preceding pause, limiting the number of successive stepping-motor driving actions following the pause time, below a maximum permissible count.

6. A method of controlling an optical disc apparatus which uses a beam expander to correct any spherical aberration of a laser beam emitted to an optical disc, the method comprising the steps of:
   moving a movable lens of the beam expander in a direction of an optical axis by driving a stepping motor;
   calculating a cumulative operation time of the stepping motor from an operation time and pause time thereof; and
   when the cumulative operation time exceeds a threshold value, setting a required waiting time and then starting a next driving action of the stepping motor.

* * * * *